United States Patent
Friedli et al.

(10) Patent No.: US 7,319,966 B2
(45) Date of Patent: Jan. 15, 2008

(54) METHOD OF COMMUNICATING INFORMATION FOR ELEVATOR USERS

(75) Inventors: Paul Friedli, Remwtschwil (CH); Kilian Schuster, Ballwil (CH); Lennart Svensson-Hilford, Berlin (DE)

(73) Assignee: Inventio AG, Hergiswil NW (CH)

( * ) Notice: Subject to any disclaimer, the term of this patent is extended or adjusted under 35 U.S.C. 154(b) by 506 days.

(21) Appl. No.: 10/095,838

(22) Filed: Mar. 12, 2002

(65) Prior Publication Data
US 2002/0129995 A1 Sep. 19, 2002

(30) Foreign Application Priority Data
Mar. 14, 2001 (EP) .................... 01810256

(51) Int. Cl.
*G06Q 10/00* (2006.01)
(52) U.S. Cl. .................. 705/1; 187/391; 187/392; 187/396; 187/388; 705/14
(58) Field of Classification Search .............. 705/1, 705/15; 187/381–392, 396; 704/231, 236, 704/243
See application file for complete search history.

(56) References Cited

U.S. PATENT DOCUMENTS

| | | | |
|---|---|---|---|
| 5,689,094 A | 11/1997 | Friedli et al. | |
| 6,073,727 A | 6/2000 | DiFranza et al. | |
| 6,341,668 B1 * | 1/2002 | Fayette et al. | ............... 187/391 |
| 6,615,175 B1 * | 9/2003 | Gazdzinski | .................. 704/275 |
| 2002/0013144 A1 * | 1/2002 | Waters et al. | ................ 455/414 |

FOREIGN PATENT DOCUMENTS

| | | | |
|---|---|---|---|
| JP | 63181099 | | 7/1988 |
| JP | 06033140 B | | 5/1994 |
| JP | 08108981 A | * | 4/1996 |
| JP | 10182025 A | | 7/1998 |
| WO | WO 00/59818 | | 10/2000 |

OTHER PUBLICATIONS

Proquest article,, Business World; Special Feature: Elevators: Otis line boasts of more value-added features.; Feb. 28, 2001.*

* cited by examiner

*Primary Examiner*—John G. Weiss
*Assistant Examiner*—Traci L. Casler
(74) *Attorney, Agent, or Firm*—Fraser Clemens Martin & Miller LLC; William J. Clemens

(57) ABSTRACT

A method of communicating information to elevator users utilizes a building server to store elevator user personal information profiles and information to be communicated. When an elevator user is identified, the building server communicates a portion of the stored information based upon the associated profile. The building server functions as a data manager and is connected to various different sources of data to collect the information to be communicated. The data sources can include videos, movies, the Internet, the elevator control, the building control center, etc. An identification unit controls access by the elevator users. The elevator user is able to receive the communicated information on a display unit in the vicinity of or in the elevator car.

10 Claims, 1 Drawing Sheet

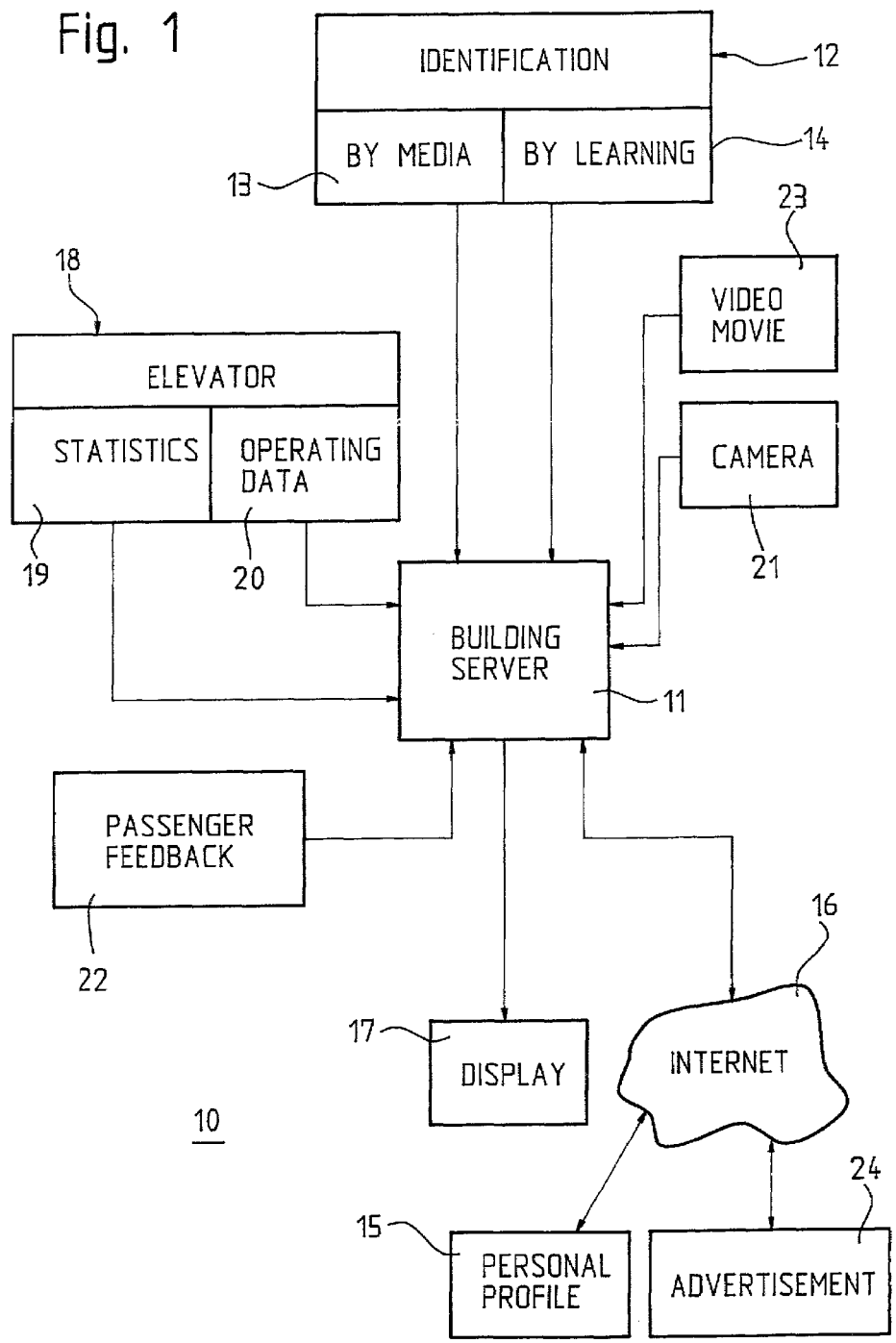

METHOD OF COMMUNICATING INFORMATION FOR ELEVATOR USERS

BACKGROUND OF THE INVENTION

The present invention relates to a method of communicating information for elevator users.

The PCT patent specification WO 00/59818 shows a device that communicates information to elevator car passengers. For the purpose of communicating information by vision and/or sound, the elevator car is equipped with a visual display unit (VDU) and a loudspeaker. In addition, sensors are provided which detect operating parameters such as the presence of elevator users, the direction of travel of the elevator car, the current position of the elevator car and/or the floor at which the elevator car is currently standing, the load in the elevator car, and the selected floor. The information to be communicated is provided on the basis of the operating parameters identified above. The information can consist of announcements, advertisements, news, pictures, moving pictures, photographs, current events, floor occupancy and/or events on specific floors, data about the elevator, etc, and can depend on the floor on which the elevator car is standing, the destination floor, the direction of travel, etc.

A disadvantage of the known device described above is that if the elevator car is quite full, not every user can receive the information because, for example, their view of the VDU is obstructed, or because some elevator users are talking and drown out the sound. Also, if the elevator is quite full, it is difficult to find the optimal selection of information for the majority of the elevator users.

SUMMARY OF THE INVENTION

The present invention avoids the disadvantages of the above-described known device and provides a method that takes account of the information wishes of the elevator users.

The present invention concerns a method of communicating information for elevator users comprising the steps of: a. storing in a building server elevator user-specific data and information to be communicated; b. providing a display unit; and c. communicating to an elevator user through the display unit at least a portion of the stored information based upon the stored elevator user-specific data. The method can include prior to performing the communicating step, identifying the elevator user to the building server and selecting the information to be communicated depending on the identification of the elevator user. The method includes storing a personal information profile as at least a portion of the elevator user-specific information stored in the building server.

Each elevator user is permitted to initially input the associated personal information profile into the building server and to change the associated personal information profile stored in the building server. The information to be communicated is obtained from a plurality of data sources selected based upon the elevator user-specific data. The method includes analyzing momentary information needs of several elevator users and communicating the stored information desired by the greatest number of the several elevator users.

The advantages achieved by the method according to the present invention are that the information can be utilized more effectively, in that each elevator user can be served individually. Furthermore, the devices of an elevator installation having destination floor control can be used for communicating information. The information can be communicated to the elevator user before entering the elevator car. By means of early communication of information regarding use of the elevator, the elevator user can be assisted in operating and/or using the elevator, and the elevator installation can be used more efficiently. By means of personal communication of information, the needs of each elevator user can be taken into consideration.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a schematic block diagram of an apparatus for individual communication of information for elevator users by the method according to the present invention.

DESCRIPTION OF THE PREFERRED EMBODIMENT

Investigations have revealed that the elevator car is not the most suitable place for communicating information to users, but the vicinity of an elevator entrance is the most suitable place. With destination floor control systems, the user communicates his or her destination floor to the elevator control at the boarding landing. The travel task is assigned to an elevator car with the most favorable travel conditions, and the elevator car that will execute the travel task is communicated to the elevator user. Until the elevator car is entered, sufficient time remains for the communication of additional information to the user.

FIG. 1 shows diagrammatically the structure of an individual and/or user-specific means 10 of communicating information for elevator users. At the center of the communication means 10 is a BUILDING SERVER 11 that acts as a data manager and to which various sources of data are connected. An IDENTIFICATION unit 12 is connected to the BUILDING SERVER 11 registers the personal data of an elevator user which comprises, for example, their last name, first name, address, apartment floor number, occupation, status, leisure activities, preferences, or other personal data. If the data is already known, the name or an identification code of the elevator user is sufficient. The elevator user can be identified touchlessly through a BY MEDIA reader 13 or interactively through a BY LEARNING display unit 14.

Touchless identification requires, for example, a chip storing the personal data which chip is carried by the elevator user. Typically, the chip is embedded in a card that is scanned by the reader 13. If the elevator user does not carry a chip, questions regarding their person, corresponding to the pattern stated above, are asked interactively on the display unit 14. For example, questions can be displayed on a touch screen (not shown), and the user can answer by means of the touch screen. The answers are continuously checked and compared with existing data. If elevator users cannot be completely identified, they are registered as users with restricted information access.

During identification, a personal information profile (PERSONAL PROFILE) 15 also can be registered, which profile comprises data regarding the scope of the desired information to which the elevator user wishes to have access. As explained below, the elevator user can also communicate his/her PERSONAL PROFILE 15 via an INTERNET connection 16 with the BUILDING SERVER 11. Incompletely identified elevator users receive a personal information profile which comprises general information. Identification of the elevator user and communication of the information take place on a processor with an independent program, the processor being arranged with another DISPLAY unit (touch screen) 17 in the vicinity of an elevator entrance and connected to the BUILDING SERVER 11. At the main entrance, or by groups of elevators, several processors each with a touch screen can be provided. Processors with VDUs can also be arranged inside the elevator cars such as an ELEVATOR unit 18 connected to the BUILDING SERVER 11. In this way, it is possible for users to continue a "story" which was started outside the elevator while the elevator is traveling. Once an elevator user is identified, the processor communicates with the BUILDING SERVER 11 and receives the corresponding information based on the personal information profile (PERSONAL PROFILE) 15.

Depending on the information profile, the respective elevator user can access his/her desired information via the touch screen of the DISPLAY unit 17, or the touch screen of the ELEVATOR unit 18, which information may comprise visual and/or aural information. The information provided can depend on the floor, the floor occupation, etc. The total information available is, for example, as follows:

Electronic mailbox: The elevator user can receive and send e-mails.

Personal traffic information: The place of residence of the respective elevator user is known to the system. Based on this information, the traffic information can include, for example, information about traffic jams on the way to the place of residence.

Personal business information: A business person can be provided with data about his/her company.

User-specific advertising: Advertising information can, for example, be communicated according to the purchasing interests of an elevator user.

Personal interests and preferences: Depending on his/her personal interests, the elevator user can be provided with, for example, news, weather, sports results, sports events, stock exchange data, entertainment, comics, etc.

Persons with knowledge of the elevator, as for example the building supervisor, can be provided with elevator-specific information such as, for example, fault messages.

Elevator specialists can communicate with the ELEVATOR unit 18 and inquire, for example, about stored STATISTICS information 19 and/or stored OPERATING DATA 20, or issue certain elevator commands.

Security personnel can, for example, view pictures from one or several surveillance cameras (CAMERA) 21 connected to the BUILDING SERVER 11.

If the elevator user has further information wishes, he/she can add to, or modify, his/her information profile via a PASSENGER FEEDBACK interface 22 connected to the BUILDING SERVER 11. The touch screen DISPLAY unit 17 can serve as the PASSENGER FEEDBACK interface. The elevator user can also be interactively provided with information, the further information being provided based on the results of questions/answers.

If several elevator users are waiting for an elevator car, or are traveling in an elevator car, the momentary information need of each elevator user is analyzed, and the information desired by the greatest number of users is made available.

The supply of information as described above is related to the interests of the elevator user. The information is not directly related to persons and does not, for example, include calling out the car assignment and the person's name (Mr. P. Smith, elevator car A). The information communicated depends on user-specific data, but personally addressed information for using the elevator is not included in the information.

For the purpose of collecting information, the building operator has several sources of data available. Video information or movies can be loaded onto the BUILDING SERVER 11 through a connected VIDEO MOVIE unit 23. Pictures from one or several surveillance cameras (CAMERA) 21 can also be loaded on the BUILDING SERVER 11. Further, the BUILDING SERVER 11 is also connected to the Internet by the INTERNET connection 16. The BUILDING SERVER 11 updates its database (news, stock exchange, pictures, etc.) from Internet "visits". Advertising agencies can load ADVERTISEMENT information 24 onto the BUILDING SERVER 11 via the Internet connection 16, the building server knowing how often a certain advertisement is delivered to the elevator users. Other Internet users can also communicate their information to the building server via the INTERNET connection 16. For example, a movie theater operator can load his/her movie program onto the building server, or a restaurant its menu. Bookings or reservations by the elevator user are rewarded with a bonus. The elevator users can also communicate their PERSONAL PROFILE information 15 via the Internet connection 15 or a display unit, or modify it via the Internet. The building operator can, for example, set up a database on the BUILDING SERVER 11 which includes a user-specific greeting upon identification, with congratulations on the user's birthday, or on their business success, or with notification of special dates, etc.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method of communicating information for elevator users comprising the steps of:
   a. storing in a building server elevator user-specific data of a plurality of elevator users including identification data unique to each of the elevator users and associated information selected by the elevator user to be communicated;
   b. providing a display unit in a vicinity of an elevator entrance;
   c. after performing said steps a. and b., identifying one of the elevator users, when in a vicinity of an elevator entrance, to the building server with the unique user-specific identification data and selecting at least a portion of the stored associated information based upon, the stored elevator user-specific data;
   d. communicating to the one elevator user through the display unit the at least a portion of the stored associated information based upon the stored elevator user-specific data; and
   e. when at least another of the elevator users also is in the vicinity of the elevator entrance, analyzing momentary information desires of all of the elevator users in the vicinity and communicating through the display the stored associated information desired by the greatest number of the elevator users in the vicinity when at least two of the elevator users have the same momentary information desires.

2. The method according to claim 1 including storing an associated personal information profile as at least a portion of the elevator user-specific identification data stored in the building server.

3. The method according to claim 2 including permitting each of the elevator users to initially input the associated personal information profile into the building server.

4. The method according to claim 2 including permitting each of the elevator users to change the associated personal information profile stored in the building server.

5. The method according to claim 1 wherein said step b. includes connecting the display unit to the building server.

6. The method according to claim 1 wherein step a. is performed by obtaining the information to be communicated from a plurality of data sources selected based upon the elevator user-specific data.

7. The method according to claim 1 including performing said step c. by identifying each of the elevator users with the unique identification data provided to one of a media reader and a touch screen connected to the building server.

8. The method according to claim 1 wherein the unique identification data includes at least one of a name and an identification code.

9. The method according to claim 1 wherein said step b. is performed by providing a first display unit in the vicinity of the elevator entrance and a second display unit in an elevator car and connecting the first and second display units to the building server.

10. The method according to claim 9 wherein said step d. is performed by starting communication of the at least a portion of the stored information through the first display unit and continuing the communication through the second display unit when the one elevator user enters the elevator car.

* * * * *